(12) United States Patent
Vehige et al.

(10) Patent No.: US 9,413,211 B2
(45) Date of Patent: Aug. 9, 2016

(54) MULTIPLE SPEED MOTOR WITH THERMAL OVERLOAD PROTECTION

(71) Applicant: Nidec Motor Corporation, St. Louis, MO (US)

(72) Inventors: Joseph A. Vehige, Saint Charles, MO (US); Alex V. Wiegmann, Breese, IL (US); Ryan M. Bastien, Saint Charles, MO (US)

(73) Assignee: Nidec Motor Corporation, St. Louis, MO (US)

(*) Notice: Subject to any disclaimer, the term of this patent is extended or adjusted under 35 U.S.C. 154(b) by 276 days.

(21) Appl. No.: 13/837,792

(22) Filed: Mar. 15, 2013

(65) Prior Publication Data

US 2014/0265742 A1 Sep. 18, 2014

(51) Int. Cl.
| | |
|---|---|
| H02K 11/00 | (2016.01) |
| H02K 23/36 | (2006.01) |
| H02P 29/00 | (2016.01) |
| H02P 25/18 | (2006.01) |
| H02H 7/085 | (2006.01) |
| H02K 3/20 | (2006.01) |
| H02K 16/04 | (2006.01) |

(52) U.S. Cl.
CPC .............. *H02K 11/27* (2016.01); *H02H 7/0852* (2013.01); *H02K 11/25* (2016.01); *H02K 23/36* (2013.01); *H02P 25/18* (2013.01); *H02P 29/0055* (2013.01); *H02K 3/20* (2013.01); *H02K 16/04* (2013.01)

(58) Field of Classification Search
CPC ........................... H02K 11/0047; H02K 11/27
USPC ......................................... 310/68 C
See application file for complete search history.

(56) References Cited

U.S. PATENT DOCUMENTS

| 3,718,879 | A | * | 2/1973 | Perry ............................... 337/95 |
| 4,100,444 | A | * | 7/1978 | Boyd, Jr. ........................ 310/184 |
| 4,263,540 | A | * | 4/1981 | Brandt et al. .................. 318/775 |
| 5,852,338 | A | * | 12/1998 | Boyd et al. ..................... 310/89 |
| 2001/0050609 | A1 | * | 12/2001 | Takeda ............... H01H 37/5427 337/333 |
| 2006/0198735 | A1 | * | 9/2006 | Iijima et al. .................. 417/44.1 |

OTHER PUBLICATIONS

Cooper Bussman; Motor Protection; Voltage Unbalance & Single-Phasing; p. 133-144; Copyright 2005.
Mod-Ironic—Instruments Limited: Klixon 7AM Series Thermal Protectors; http://www.mod-tronic.com/Rewind_Sensors/Klixon.html; Copyright 2005.
US Motors—A Brand of the Nidec Motor Corporation; Methods of Winding Temperature Protection; http://www.usmotors.com/TechDocs/ProFacts/Winding-Temp-Protection.aspx; Copyright 2011.

* cited by examiner

*Primary Examiner* — Thomas Truong
(74) *Attorney, Agent, or Firm* — Hovey Williams LLP

(57) ABSTRACT

An electric motor includes a stator and a rotor. The stator has a plurality of low speed windings and a plurality of separate high speed windings. A first type of thermal overload protector is coupled with at least one of the low speed windings and a second type of thermal overload protector is coupled with at least one of the high speed windings.

1 Claim, 2 Drawing Sheets

MULTIPLE SPEED MOTOR WITH THERMAL OVERLOAD PROTECTION

BACKGROUND

Electric motors commonly include a stationary component called a stator and a rotating component called a rotor. The stator has a number of windings, and the rotor rotates within (or around) the stator when the stator windings are energized with a driving waveform. Electric motors are used in a variety of applications including HVAC systems, appliances, etc.

Electric motors sometimes fail prematurely. Motor failures interrupt the operation of the systems in which they are used and can cause significant economic losses and safety problems. Many motor failures are related to excessive heat. A motor can overheat due to a variety of factors including a locked rotor, low line voltage, starting overload, running overload, poor motor ventilation, and/or abnormally high ambient temperatures. Such overheating can damage the insulation on the stator windings, which reduces motor life and can even result in complete motor failure and fires.

Most motors are therefore equipped with thermal overload protection devices that cut off electricity to the motors when motor temperatures exceed a maximum safe level. Many different overload protection devices have been developed including: current sensitive devices such as circuit breakers, fuses, etc. that are typically mounted external to motors and sense current overloads; combination current and temperature sensitive devices such as thermal disc type protectors that are often mounted in motor casings; and temperature sensitive devices that are wired directly to motor windings to directly sense motor winding temperatures.

Governmental and/or regulatory entities have stiffened the efficiency requirements of HVAC systems and other electrical systems with multispeed motors. Such motors typically have two or more sets of stator windings to provide two or more motor speeds. For safety reasons, when independent stator windings are used for different motor speeds, each set must be separately protected against thermal overloads.

SUMMARY

Applicant has discovered that equipping multi-speed motors with thermal overload protection devices for all stator windings can be difficult for a variety of issues. For example, although thermal disc type protectors provide excellent protection against thermal overloads, many motor casings are not large enough to accommodate a separate protector for each motor speed.

Embodiments of the present invention solve the above described problems by providing improved techniques for protecting multispeed electric motors against thermal overloads. A motor constructed in accordance with an embodiment of the present invention may be used in a washing machine, HVAC system, pump system or any other application and broadly comprises a stator and a rotor. The stator has a plurality of low speed windings and a plurality of separate high speed windings. A first type of thermal overload protector is coupled with at least one of the low speed windings and a second different type of thermal overload protector is coupled with at least one of the high speed windings.

In one embodiment, the first type of thermal overload protector is a relatively small and inexpensive on-winding thermal protector, and the second type of thermal overload protector is a relatively larger and more costly phenolic disc type protector. Applicant has discovered that the current on the low speed stator windings is low enough to permit use of the on-winding type protector, whereas the current on the high speed stator windings necessitates use of the phenolic disc type protector. By using two distinct types of thermal overload protectors, the shell or casing of the motor can be smaller because it only has to accommodate one phenolic disc type protector. The present invention also reduces the overall cost of the motor because a less expensive on-winding protector is used for the low speed windings.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
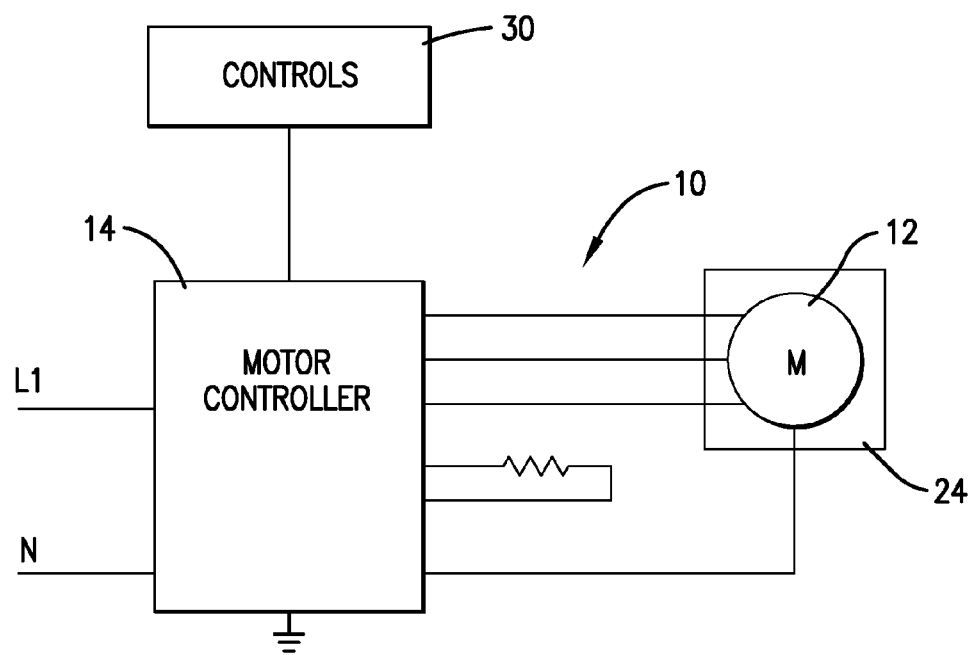
FIG. 1 is a block diagram of a motor assembly constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and initially FIG. 1, a motor assembly 10 constructed in accordance with embodiments of the invention is illustrated. The motor assembly 10 may be used in any application, such as in a washing machine, HVAC system, pump system, or appliance. In one embodiment, the motor assembly 10 is designed for use in a blower assembly of an HVAC system, but the principles of the present invention are equally applicable to all uses of the motor assembly.

An embodiment of the motor assembly 10 broadly includes an electric motor 12 and a motor controller 14. The motor assembly 10 may also include or be coupled with other systems or components not relevant to the present invention.

Figure 2:
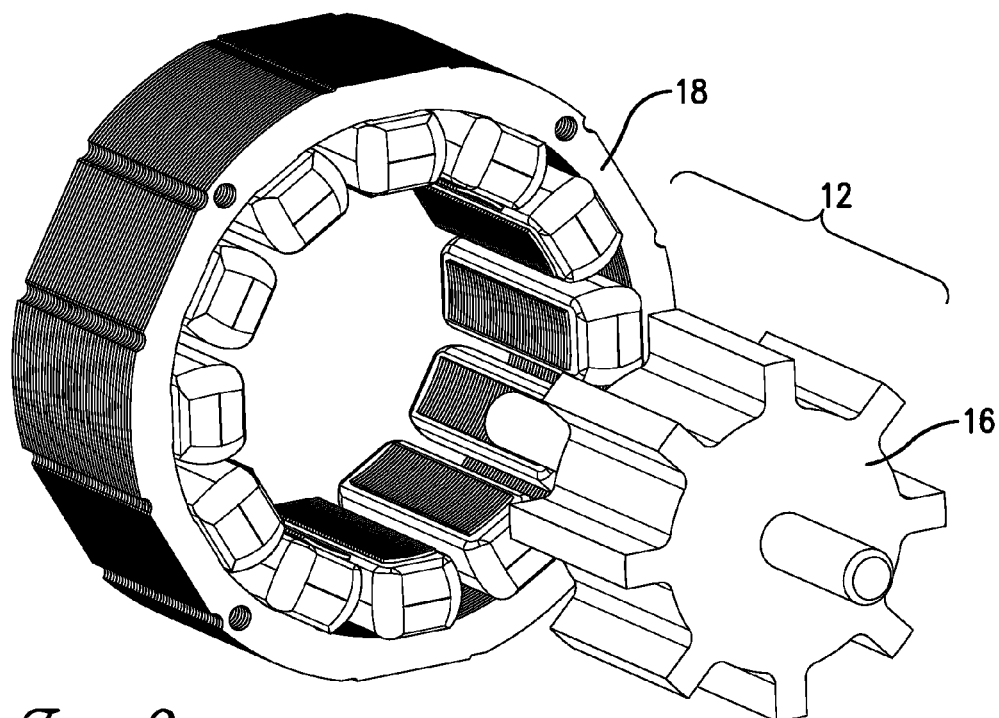
FIG. 2 is a schematic representation of the stator and rotor of the motor shown in FIG. 1.

As best illustrated in FIG. 2, the electric motor 12 includes a rotor 16 and a stator 18. The motor 12 may operate on direct current (DC) or alternating current (AC), may be synchronous or asynchronous, and may be single phase or three phase. The motor 12 may be of any type, including but not limited to, a brushed or brushless DC motor, a coreless or ironless DC motor, a series wound universal motor, an induction motor, a torque motor, or a stepper motor. Moreover, the motor may have any voltage and horsepower (HP) rating.

Figure 3:
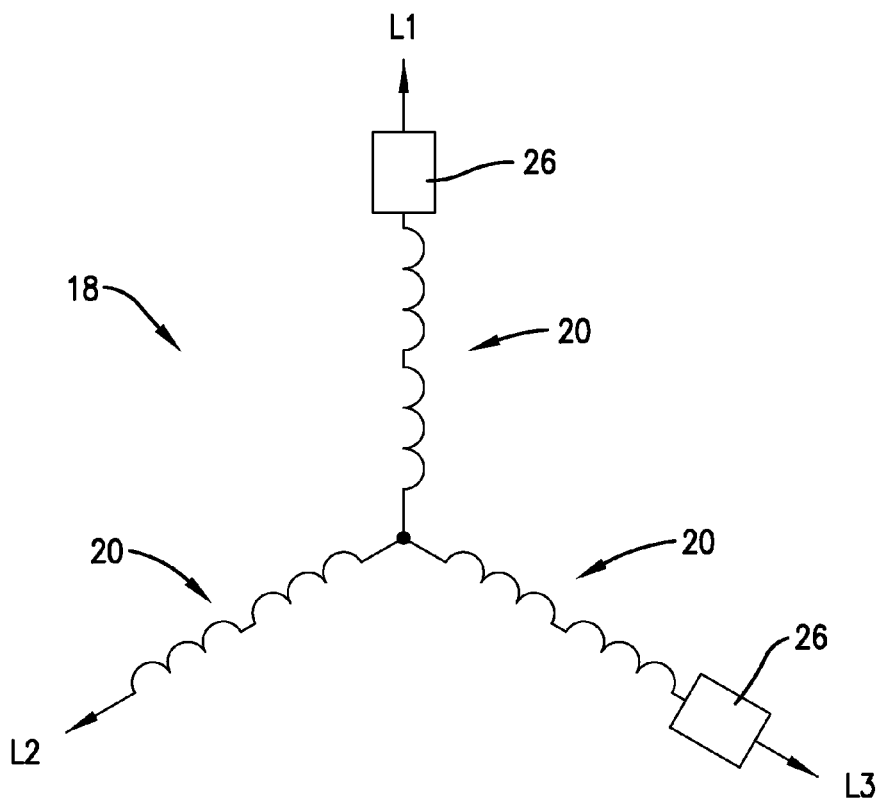
FIG. 3 is a schematic diagram of the low speed stator windings of the electric motor.
Figure 4:
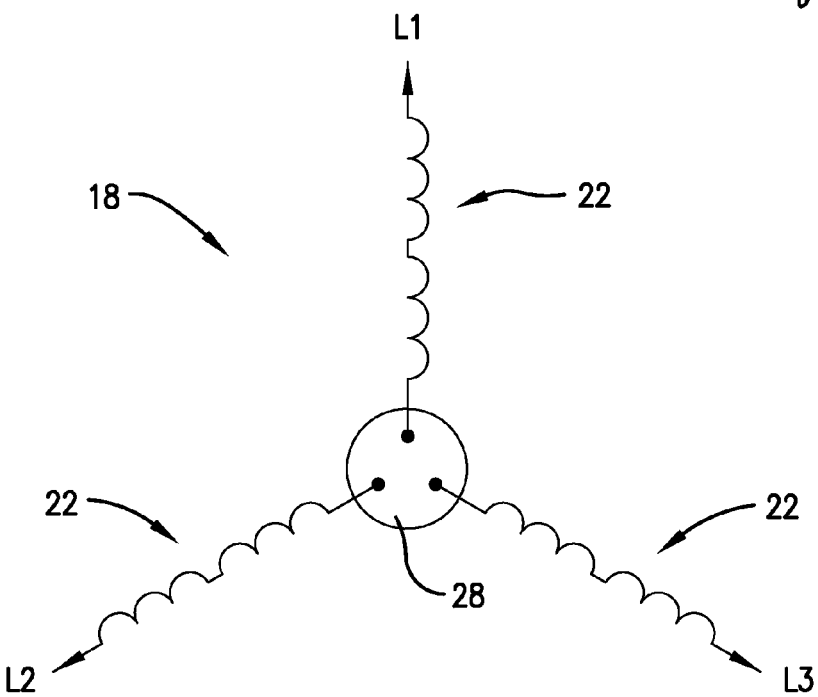
FIG. 4 is a schematic diagram of the high speed stator windings of the electric motor.

To provide for multi-speed operation, an embodiment of the stator 18 includes a number of low speed windings 20 and a number of independent high speed windings 22 as shown in FIGS. 3 and 4. The low speed windings 20 and high speed windings 22 are powered by separate motor leads so that the two motor speeds are on separate circuits. For example, the motor 12 may include a three phase power input that provides independent three phase power to the low and high speed windings. In one embodiment, the motor includes 6-pole low speed windings as shown in FIGS. 3 and 4-pole high speed windings as shown in FIG. 4.

In one particular embodiment of the invention, the motor 12 is a three phase, 36 slot, multi-speed, induction motor that is rated 0.75/0.33 HP at 208-230 Volts, 1/0.44 HP at 460 Volts, and 2/0.89 HP at 575 Volts. However, the principles of the present invention are not limited to any particular motor type, technology, or size.

The motor also has a motor casing, housing, or shell 24 that at least partially encloses and protects the stator 18 and the rotor 16. The motor shell 24 has an end shield in which wiring and electrical components of the motor assembly are mounted as described below.

In accordance with one important aspect of the invention, a low speed winding thermal overload protector 26 is coupled with the low speed windings as shown in FIG. 3 and a high speed winding thermal overload protector 28 is coupled with the high speed windings as shown in FIG. 4. The low speed winding and high speed winding thermal overload protectors are electrically isolated from one another to provide independent protection of the low and high speed windings. In some embodiments, the low speed winding thermal overload protector 26 and the high speed winding thermal overload protector 28 may be different types. In other embodiments, the low speed winding thermal overload protector 26 and the high speed winding thermal overload protector 28 may be the same type.

One type of protector that may be used with both the low speed winding thermal overload protector 26 and the high speed winding thermal overload protector 28 is an on-winding thermal overload protector. In one implementation, two on-winding protectors are used with one on-winding protector connected to each of the windings of two phases, as shown for example with the low-speed stator windings 20 in FIG. 3. In other implementations, three on-winding protectors are provided such that the windings of all three phases are protected. An exemplary type of on-winding thermal overload protector may be Klixon® 7 AM series thermal protectors. Other series or families of thermal protectors from Klixon® may be used as well as thermal protectors from other manufacturers or vendors. The 7 AM protectors are thermally operated snap action devices with miniature bimetal snap-action contacts through which current flows. If the windings to which the protectors are connected overheat for any of the reasons discussed above, the heating effect of the current flow through the contacts causes the contacts' temperatures to rise. When the contacts' temperatures reaches their calibrated set point temperature, they snap open and disconnect the current to the stator windings. When the windings and hence the contacts of the on-winding thermal overload protectors have cooled to an acceptable operating level, the protectors automatically reset and close to allow the motor 12 to restart. In a particular embodiment of the invention, the on-winding protectors are Klixon® 7 AM031 or 7 AM036 protectors, although others may be used as well.

Another type of protector that may be used with both the low speed winding thermal overload protector 26 and the high speed winding thermal overload protector 28 is a disc type thermal overload protector that is positioned in the end shield of the motor shell 24 and is connected to all three phases of the stator windings as shown for example with the high speed stator windings 22 in FIG. 4. The disc type of thermal overload protector may be a phenolic disc type protector, and in an exemplary embodiment, is a Klixon® MWJ series protector with a ¾" bimetallic snap acting disc on which the contacts for the three phases of the stator windings are mounted and through which current flows. If the stator windings overheat for any of the reasons discussed above, the heating effect of the current flow through the disc causes the disc temperature to rise. When the disc temperature reaches its calibrated set point temperature, it snaps open and disconnects the current to the stator windings. When the windings and hence the disc has cooled to an acceptable operating level, the phenolic disc protector automatically resets and closes to allow the motor 12 to restart. In practice, the phenolic disc may include other series or families of protectors from Klixon® or other manufacturers or vendors.

The motor controller 14 provides power to and controls operation of the electric motor 12. As shown in FIG. 1, the motor controller 14 may receive power from a single phase AC supply voltage at 115 VAC supplied by connections L1 and N, where L1 represents the "hot" side of the AC supply and N represents neutral, which is typically at earth potential. The AC supply voltage may also be 230 VAC, in which case the neutral line would be replaced with another hot supply line. The AC supply voltage may also be three phase 480 VAC.

The motor controller 14 may include any combination of circuitry, hardware, firmware, and/or software. In one particular embodiment, the motor controller 14 includes a custom application specific integrated circuit (ASIC) with a microprocessor that controls and drives a 3-phase inverter that provides a three phase driving waveform to the low speed coils 20 and high speed coils 22 of the stator 18. The motor controller 14 may also include various other electronic components.

The motor controller 14 may receive commands or operating instructions from one or more controls 30 such as a keypad, switches, or buttons as are commonly found on HVAC systems and other devices. The controls 30 may be one or more separate components or may be integrated in the motor controller 14.

The above-described invention offers numerous advantages. For example, by using relatively smaller on-winding type protectors on the low speed windings 20 and a relatively larger phenolic disc type protector only on the high speed windings 22, the motor casing 24 can be smaller because it only has to accommodate one phenolic disc type protector. The present invention also reduces the overall cost of the motor 12 because a less expensive on-winding protector 26 is used for the low speed stator windings 22.

Although the invention has been described with reference to the preferred embodiment illustrated in the attached drawing figures, it is noted that equivalents may be employed and substitutions made herein without departing from the scope of the invention as recited in the claims. For example, the specific motor ratings, sizes, etc. disclosed herein can be altered without limiting the scope of the intention.

Having thus described the preferred embodiment of the invention, what is claimed as new and desired to be protected by Letters Patent includes the following:

The invention claimed is:

1. A motor assembly comprising:
  a motor controller; and
  a three-phase electric motor driven by the motor controller and comprising:
    a stator including three low speed three-phase windings and three high speed three-phase windings;
    a rotor rotatably coupled with the stator;
    three on-winding non-phenolic bimetal snap-action thermal overload protectors each coupled with a different one of the three low speed three-phase windings, the three on-winding non-phenolic bimetal snap-action thermal overload protectors being configured to protect all three phases of the low speed three-phase windings;
    a single phenolic bimetal snap-action disc type thermal overload protector coupled with all three of the high speed three-phase windings and configured to protect all three phases of the high speed three-phase windings, the single phenolic bimetal snap-action disc type thermal overload protector being electrically isolated from the three on-winding non-phenolic bimetal snap-action thermal overload protectors; and
    a motor shell that partially encloses and protects the stator and the rotor, wherein the three on-winding non-phenolic bimetal snap-action thermal overload protectors are wired directly to the low speed three-phase windings and the single bimetal snap-action disc type thermal overload protector is positioned outside the stator.

* * * * *